(12) United States Patent
Pennock et al.

(10) Patent No.: US 8,442,984 B1
(45) Date of Patent: May 14, 2013

(54) WEBSITE QUALITY SIGNAL GENERATION

(75) Inventors: Christopher C. Pennock, Brooklyn, NY (US); Jeremy Hylton, Easton, PA (US); Corinna Cortes, New York, NY (US)

(73) Assignee: Google Inc., Mountain View, CA (US)

( * ) Notice: Subject to any disclaimer, the term of this patent is extended or adjusted under 35 U.S.C. 154(b) by 579 days.

(21) Appl. No.: 12/059,352

(22) Filed: Mar. 31, 2008

(51) Int. Cl.
*G06F 7/00* (2006.01)

(52) U.S. Cl.
USPC ............ 707/748; 715/234; 715/738; 709/225

(58) Field of Classification Search .................. 709/201, 709/225; 705/1; 707/748; 715/234, 738; 706/13
See application file for complete search history.

(56) References Cited

U.S. PATENT DOCUMENTS

| | | | |
|---|---|---|---|
| 2002/0040384 A1* | 4/2002 | Moetteli | 709/201 |
| 2006/0253584 A1* | 11/2006 | Dixon et al. | 709/225 |
| 2006/0282336 A1* | 12/2006 | Huang | 705/26 |
| 2007/0038607 A1* | 2/2007 | Herman et al. | 707/3 |
| 2007/0038646 A1* | 2/2007 | Thota | 707/100 |
| 2007/0100875 A1* | 5/2007 | Chi et al. | 707/102 |
| 2007/0208613 A1* | 9/2007 | Backer | 705/10 |
| 2007/0271246 A1* | 11/2007 | Repasi et al. | 707/3 |
| 2007/0282670 A1* | 12/2007 | Repasi et al. | 705/10 |
| 2007/0294100 A1* | 12/2007 | Chen et al. | 705/1 |
| 2008/0114709 A1* | 5/2008 | Dixon et al. | 706/13 |
| 2008/0168045 A1* | 7/2008 | Suponau et al. | 707/5 |
| 2008/0201348 A1* | 8/2008 | Edmonds et al. | 707/101 |
| 2008/0228580 A1* | 9/2008 | Korman et al. | 705/14 |
| 2009/0222431 A1* | 9/2009 | Kumar | 707/5 |
| 2010/0169343 A1* | 7/2010 | Kenedy et al. | 707/758 |

OTHER PUBLICATIONS

Zhou, Y. Document Quality Models for Web Ad Hoc Retrieval [online], [retrieved on Mar. 31, 2008]. Retrieved from the Internet <URL: http://ciir.cs.umass.edu/pubfiles/ir-432long.pdf.
U.S. Appl. No. 11/160,872, filed Jul. 13, 2005, Riley.
Cortes, Corinna; Support-Vector Networks; Machine Learning, 20; 1995; pp. 273-297; Kluwer Academic Publishers, Boston; Netherlands.

* cited by examiner

*Primary Examiner* — Pierre Vital
*Assistant Examiner* — Christopher J Raab
(74) *Attorney, Agent, or Firm* — Fish & Richardson P.C.

(57) ABSTRACT

Systems and methods relating to website quality rating are disclosed. Websites are rated, relationships between ratings and website signals are identified, models are generated and modeled ratings are assigned to unrated websites by applying the models to the website signals of the unrated websites.

28 Claims, 3 Drawing Sheets

WEBSITE QUALITY SIGNAL GENERATION

BACKGROUND

The subject matter of this specification relates to rating websites on the internet.

The availability of web development applications has made it easy for Internet users to publish websites to express their views. For instance, a number of online services offer free web hosting and web log ("blog") hosting. These services enable anyone with Internet access to publish a blog within a few minutes. This has led to a dramatic increase in the number of websites on the Internet. These websites are of varying quality.

The increase in the number of published websites and the unprecedented access to the Internet have helped increase the popularity of using search engines to find information. Users can receive a list of websites related to a topic by entering a search string associated with the topic, thereby reducing the time required to find information. However, with the increased number of websites on any given topic, a search is not guaranteed to result in a list of quality websites. This is particularly true for blogs, which can be used for various purposes by the publishers. Some blog publishers merely use blogs to publish poorly drafted content or repost information found on other websites, while other publishers use blogs to express unique views regarding popular topics. Therefore, a search for a topic can produce a list of websites, but the quality of the websites listed can vary.

SUMMARY

In general, one aspect of the subject matter described in this specification can be embodied in methods that include the actions of associating a website quality rating with website signals, identifying relationships between the website signals and the website quality ratings, creating a model that characterizes the relationship between the website quality ratings and the website signals, and applying the model to website signals of an unrated website to generate a calculated quality rating for the unrated website. Other implementations of this aspect include corresponding systems, apparatus, and computer program products.

These and other implementations can optionally include one or more of the following features. The method can include the steps of receiving a search request and returning a list of websites having a stored quality rating exceeding a threshold. The websites can be blogs.

In other implementations, the method can include the steps of identifying website signals predictive of website quality, selecting websites having a predicted quality based on a normalized quality indicator and according to a quality distribution, receiving website quality ratings for the websites, and determining a relationship between the website quality rating and the website signals.

Particular implementations of the subject matter described in this specification can be implemented so as to realize one or more of the following advantages. One advantage realized is greater user satisfaction with web search engines.

Another advantage realized is the ability to return only websites having a quality rating higher than a threshold in response to a search request.

Another advantage realized is the ability to rank websites within displayed search results based on quality ratings.

Still another advantage realized is the ability to identify quality websites without requiring a human to view the websites.

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
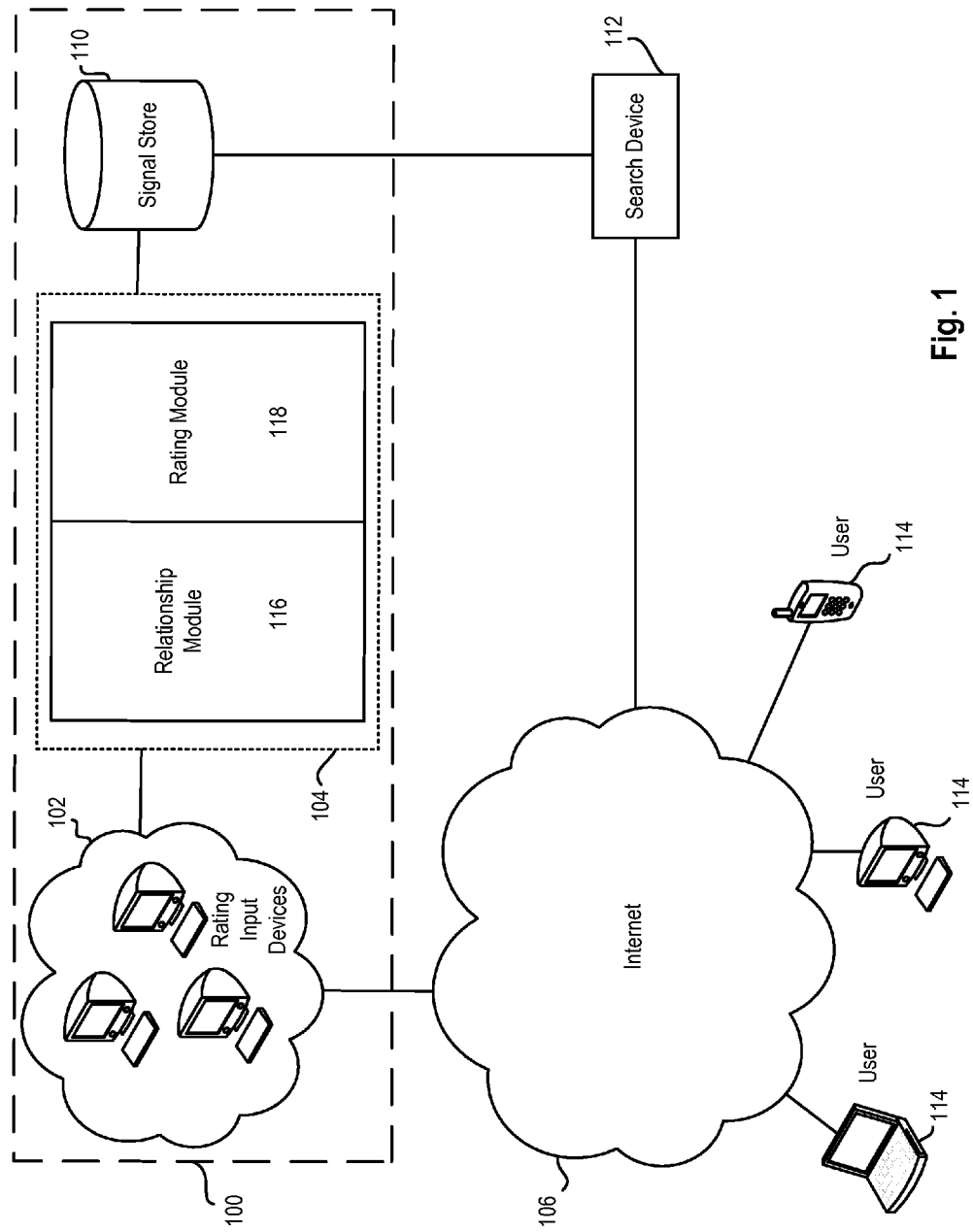
FIG. 1 is a block diagram illustrating an implementation of a website quality rating system in a network environment.

FIG. 1 is a block diagram illustrating an implementation of a website quality rating system 100 in a network environment. In some implementations, rating input devices 102 connect to a data processing apparatus, such as a quality analysis server 104, over a wide area network ("WAN"), local area network ("LAN"), or a dedicated connection. Alternatively, the rating input devices 102 can connect to the quality analysis server 104 over the Internet 106, or over any other network connection.

Raters (e.g., people) connect to the Internet 106 to view websites and rate the quality of each of the websites. The raters can submit website quality ratings to the quality analysis server 104 through the rating input devices 102. The quality analysis server 104 receives website quality ratings from the rating input devices 102 and stores the website quality ratings in the signal store 110. The website quality ratings are associated with a uniform resource locator and other website signals corresponding to the rated website.

The quality analysis server 104 identifies relationships between the website quality ratings and website signals and creates a model representing the relationships, as described below. Further, the quality analysis server 104 searches the signal store 110 for unrated websites (e.g., sites lacking a signal indicating a quality rating). The quality analysis server determines whether the unrated websites have website signals that are related to quality ratings and applies the model to the unrated websites. Application of the model results in a calculated quality rating. The quality analysis server 104 assigns the calculated quality rating to the corresponding website. The calculated quality rating is an additional website signal that is stored in the signal store 110 for use by other applications.

The signal store 110 is also connected to a search engine 112. The search engine 112 receives search requests from users 114 and returns a list of websites that are related to the search terms entered by the users 114. An exemplary search engine is described in the article S. Brin and L. Page, "The Anatomy of a Large-Scale Hypertextual Search engine 205," Seventh International World Wide Web Conference, Brisbane, Australia and in U.S. Pat. No. 6,285,999, both of which are incorporated herein by reference each in their entirety.

The search engine 112 can use the website signals stored in the signal store 110 to filter and/or order the search results based on the stored quality ratings of the websites. For example, a threshold can be used to filter websites that have a stored quality rating below the threshold. Additionally, the websites returned by the search device 112 can be ordered according to their stored quality rating such that the websites having higher stored quality ratings are listed prior to websites having lower stored quality ratings.

The users 114 can connect to the Internet using a personal computer, laptop or mobile computing device, such as an Internet ready phone or handheld device. Additionally, the users 114 can connect over a wired connection or a wireless connection.

The raters rate websites by analyzing the multiple web pages of the website and assign a website quality rating to the website based on the aggregate quality of the website as a whole. The website quality rating can be, for example, a number on a scale from 1-5, with 1 being a low website quality website and 5 being a high website quality website. Additionally, the website quality rating can be based on a number of factors such as the originality of the arguments or information on the website; the amount of original content versus copied content; and the layout of the website. While quality factors have been identified for example purposes, other quality factors can be used such as the correctness of the grammar and spelling of the text on the web pages, whether obscene or otherwise inappropriate material is presented, whether the websites have blank or incomplete pages, as well as other factors that would affect the quality of the website.

In some implementations, the categories of websites that are rated by the raters can be limited. For example, after viewing the first page of a website the raters can be prompted to categorize the website based on its content. The raters can select categories such as spam, obscene, or "did not load." For example, if a link selected by a rater does not result in a web page being presented, the rater could select the "did not load" category. If any of these categories are selected then the raters will not be required to rate that particular website. Conversely, if a category is not selected then the category is determined to be "valid" and the rater will rate the quality of the website. Categorizing the sample websites streamlines the rating process because it allows the raters to skip websites that contain objectionable content or otherwise are presumed to have a low quality.

Additionally, categorizing the websites operates as a filter to reduce the number of statistical outliers considered when identifying the relationships between the website signals and the website quality ratings. Reducing the number of statistical outliers can increase the quality of the data relied on for identifying relationships.

For example, ratings for websites having obscene material might be more highly correlated to the views of the rater regarding obscenity rather than the quality of the website itself. Therefore, these ratings can in appropriately skew the results and affect the identified relationships between the website signals and the website quality. Filtering these websites from the list of websites reviewed by the raters can prevent potential skewing of the results by the website quality ratings assigned to these websites.

The raters can also select a viewing appeal for the websites. For example, the raters can select broad appeal or niche appeal. The raters can select broad appeal if the content of the website is appealing to a broad segment of the population such as a website related to high profile national or world news events. Conversely, the raters can select niche appeal if the content of the website is appealing to a very narrow subset of the population such as a website dedicated to electromagnetism.

The viewing appeal selected by the rater can be stored in the signal store 110 as an appeal signal for use by the quality analysis server 104 or the search engine 112. The quality analysis server 104 can use the appeal signal to determine the relationship between the scope of appeal of the website and the website quality ratings. The search engine 112 can use the appeal signal as a factor to rank or filter websites presented in response to a search request.

One kind of website that can be reviewed by raters is a web log or "blog." Blogs are websites that are organized as a series of posts, each post having a title and body. The body of the post contains the blog publisher's opinions or commentary. The body can also contain links to posts on other blogs or websites that relate to the topic of the post. Additionally, using a blogging tool known as trackback, publishers can automatically present links for other blogs that have included links to posts on the publisher's blog. Therefore, content contained on the linked websites becomes incorporated to the blog by the link.

In addition to containing links to other websites, the main blog page can contain links to other parts of the blog. For example, if a particular post is lengthy, the publisher can choose to display a portion or summary of the post, providing a link to another web page that contains the post in its entirety. Similarly, the publisher can design the blog to display a subset of the posts on the main blog page. The subset can be defined as an absolute number of posts or posts that were created within a time period (e.g., posts created in the last month). Posts that are not part of the subset displayed on the main blog page can be grouped, e.g., by creation date, and published on a web page associated with the group of posts. A link to the web page containing the grouped posts is incorporated into the main blog web page so that users 114 can access the web page containing the group of posts.

In addition to presenting original posts and linking to other blogs or web pages, blogs can also incorporate content published by other publishers. This syndicated content can be included, for example, by incorporating a Really Simple Syndication ("RSS") feed into the blog. The RSS feed gathers the latest information that the RSS publisher has posted and presents a summary or portion of the information on the blog. A user can click on a link in the RSS feed to view the information in its entirety on the RSS feed publisher's website.

As discussed, a blog can include multiple web pages of original content, syndicated content and associated links to the publisher's website, as well as links to other blogs related to the topic of the blog or a particular post. Therefore, a blog typically has a number of web pages that are associated with it. In turn, the quality of the blog is based on the quality of the component web pages of the blog, including the web pages associated with the syndicated information.

To rank blogs, the raters can visit the main page of the blog and rate the quality of that page, then visit component pages of the blog and rate them individually until all pages are rated. However, to determine the quality of the blog as a whole, it is advantageous, in some implementations, for the raters to view the component pages of the blog and assign one website quality rating for the blog as a whole, rather than assigning an individual rating for each component web page. Rating the blog as a whole allows the rater to determine whether a user 114 directed to the website would be satisfied with the quality of the blog as a whole, rather than focusing on whether an individual web page has quality content.

For example, if the rater rates each web page associated with a blog individually, then only the web pages that have URLs that direct a user 114 to the blog will affect the quality rating of the blog. This is because the quality ratings are associated with the URL of the web page being viewed. Therefore, the quality rating of a page external to the blog, but linked to by the blog will only be associated with the URL of that linked web page.

However, if the website is rated based on the content that is associated with the blog, including information on a linked website, then all of the content accessible from the blog is considered by the raters when assigning the quality rating to the blog. Therefore, for example, if a blog provides a link to a web page containing information that is not related to the topic of the blog, the quality rating of the blog will suffer. The quality rating will suffer because the overall quality of the blog is lowered by containing links to websites that are off topic, or otherwise inappropriate and this is reflected in the quality score assigned to the blog. In some implementations, the raters can be limited to clicking links that are provided by the blog being rated. In other implementations, the raters can be allowed to additionally, click links that are provided on websites linked by the blog.

The quality analysis server 104 includes a relationship module 116 that receives website quality ratings from raters. In some implementations, the relationship module 116 associates the website quality ratings with the corresponding website signals. Website signals are attributes (e.g., features or metadata) associated with the website. Click rate, blog subscription rate, and PageRank™ score are examples of website signals that can be associated with a blog as described in the following paragraphs.

A click rate is an example of a website signal that can be associated with a blog. The click rate is a count of the number of times that a blog URL has been clicked in a search results list during a time period (e.g., week, month, year, etc.). There are two click rates that are associated with each blog. One click rate corresponds to the number of clicks received when the blog URL was listed in a general search engine results list (e.g., Google web search). The other click rate corresponds to the number of clicks received when the URL was listed in a blog search (e.g., Google blog search). The click rate is a blog popularity indicator and therefore a potential quality indicator.

Instead of using the raw number of clicks the click rate can be defined as a ratio representing the number of clicks that a link receives relative to the number of times that the link is displayed in search results pages. Click-through rates can also be normalized, for example, based on where the link was presented in each search results page. The normalization accounts for the inherent difference in click-through rates for a link listed at the top of the search results versus the click-through rates for a link listed at the bottom of the search results.

Blog subscription rate is another website signal that can be associated with a blog. Users 114 can subscribe to blogs they read through services such as Google Reader. The blog subscription rate is the number of users 114 that have subscribed to the blog. The blog subscription rate for blogs hosted by some reader services is located on a web page hosted by the reader service. This information can be extracted from web page and used to identify the subscription rate. Blog subscription rate is indicative of the quality of the blog because it is a measure of readership. A higher readership is indicative of a higher quality blog.

PageRank™ score is another example website signal that can be associated with a blog. The PageRank™ score is a measure of the importance of a blog within the Internet. The PageRank™ score is determined by analyzing the links to a target blog as well as the PageRank™ score of the blogs that are linked to the target blog. The PageRank™ score is indicative of the of the website because the higher the number of blogs linked to a target website, and the higher the quality of the blogs linked to the target blog, the more likely it is that the target blog is a high quality blog.

Using modeling techniques, the relationship module 116 identifies the combinations of website signals that are predictive of blog quality. The relationship module 116 can analyze the website signals and the corresponding website quality ratings to determine which website signals are most predictive of website quality. Once relationships between website quality ratings and website signals are identified, the relationship module 116 can create a model representing the relationship.

In some implementations, the model can be derived from the website signals and the website quality ratings using a machine learning subsystem that implements support vector regression. The support vector regression is trained by the website quality ratings that are received from the raters and the website signals that are associated with the website quality ratings. The support vector regression receives the set of website signals and corresponding website quality rating for each blog that was rated by the raters. Each set of website signals is known as a vector. All of the vectors associated with the rated websites are plotted in the same n-dimensional space, where n is the number of features associated with each website. The number n may be higher than the actual number of signals associated with the website, if a non-linear transformation is applied to the signal vector.

Once all of the vectors are plotted in the n-dimensional space, the support vector regression identifies an n+1 dimensional tube of a set width that encloses the vectors associated with blogs based on the website quality ratings. If several solutions are possible, the support vector regression can select the hyperplane of smallest norm to prevent overfitting the vectors.

The support vector regression generates a mathematical formula that characterizes the selected hyperplanes. The formula characterizing the hyperplanes also characterizes the relationships between the website signal values and the website quality ratings. Therefore, the mathematical formula can be used to predict website quality based on website signals.

In some implementations, the machine learning subsystem can implement a support vector machine. The support vector machine can be implemented to predict two or more distinct classifications of signals. In some implementations, once all of the vectors are plotted in the n-dimensional space as described above, the support vector regression identifies an n+1 dimensional hyperplane that best possibly separates the vectors associated with blogs based on the website quality ratings.

For example, the vectors associated with a website quality rating of one will be separated from all other vectors. In any given set of vectors there will be multiple hyperplanes that can be defined that separate the vectors associated with a given website quality rating from the rest of the vectors. The support vector regression selects the hyperplane that maximizes the distance between the support vectors (e.g. vectors closest to the hyperplane) and the hyperplane. The relationship module 116 can optionally be implemented utilizing logistic regression, neural networks or other types of machine learning.

Once a model characterizing the relationship between the website quality ratings and the website signals is derived, the rating module 118 accesses the website signals stored in the signal store 110 to identify unrated blogs. The rating module 118 applies the model to the website signals associated with the unrated blogs. In turn, the model generates a calculated website quality based on the website signals. The rating module 118 stores the calculated quality rating in the signal store 110. The calculated quality rating can be used in the same manner as website quality ratings received from raters, for example, to filter and/or order web search results.

Support vector machines are only one example provided for creating models that predict website quality. Other models can be used that determine relationships between data sets. For example, other machine learning methods (e.g., linear classifier, quadratic classifier) can be used to develop and train a predictive model based on sample data. Additionally, regression techniques (e.g., Gaussian process regression) can be used to identify relationships between data sets and generate a model that predicts quality based on the data.

Neither websites nor the website signals are static. This is particularly true with respect to blogs. Additional web pages containing new content are regularly added, content on existing web pages is edited (e.g., RSS updates), and the website signals change (e.g., changes in subscription levels, PageRank™ scores, and click rates). The new content can affect the overall quality of the blog. Additionally, the website signal changes can affect the relationships between website quality rating and website signals. Therefore, the relationship module 116 is implemented to update the models based on website quality ratings of additional rated blogs or the calculated ratings assigned to unrated websites by the rating module 118. The relationship module 116 can update the models by using updated website quality ratings for the originally rated blogs. Alternatively, the relationship module can use website quality ratings for different blogs. If updated website quality ratings for the originally rated blogs are used, a model can be derived representing the effect of website signal variations on website quality ratings. This model can be used to predict changes in website quality rating based on changes to the website signals.

A statistically relevant number of blogs are reviewed by the raters to create accurate rating models. In some implementations, blogs are selected for review according to a quality distribution. The distribution is biased to insure that a sufficient number of quality blogs are rated and to identify complex relationships between the website signal values and the website quality ratings. A group of website signals that are presumed predictive of website quality (e.g., number of posts in a blog, subscription rate, etc) are chosen to identify blogs of varying quality.

The distribution is biased by the quality analysis server 104. The quality analysis server 104 accesses and retrieves website signals from the signal store 112. The quality analysis server 104 normalizes these website signals to a specified range (e.g., 0-1). The quality analysis server 104 sums the normalized signals for each blog resulting in a normalized quality indicator for each website. The quality analysis server 104 creates distribution bins corresponding to ranges of normalized quality indicators. The number of distribution bins controls the granularity of the distribution. Additionally, each of the distribution bins can be defined to receive an independently determined range of normalized quality indicators. Then the quality analysis server 104 assigns normalized quality indicators to the bins. In some implementations, a plurality of normalized quality indicators are assigned to each bin. Once the distribution bins are full, the uniform resource locators associated with the normalized quality indicators are retrieved and a list of the uniform resource locators for the blogs is created. The list is randomized so that each rater will receive a random sample of the blogs.

For example, a distribution for a sample of 1000 blogs can have three bins. One bin can receive normalized quality indicators that are presumed to represent low quality blogs. This bin can be defined to accept a first range of normalized quality indicators (e.g., 0-1). Additionally, this bin can be defined to receive 100 normalized quality indicators.

Another bin can receive normalized quality indicators that are presumed to represent high quality blogs. This bin can be defined to accept a second range of normalized quality indicators (e.g., 4-n). Similarly, this bin can be defined to receive 100 normalized quality indicators.

The final distribution bin can receive normalized quality indicators that fall between the low quality range and high quality range (e.g., 1-4). This bin can be defined to receive 800 normalized quality indicators. In this example, 800 of the blogs that will be rated by the raters will have a presumed quality that is neither very low nor very high, while 100 will be presumed to be very low quality and 100 will be presumed to be very high quality. This causes more blogs in the sample to have a presumed quality rating near the middle of the quality spectrum.

The sample is biased in this manner to identify nuanced relationships between blog signals and website quality ratings that likely exist for these blogs. Additionally, when the sample is biased in this manner, a larger number of support vectors will be included in the sample because the sample blogs will have vectors (e.g., signals) that will be located closer to the selected hyperplane and therefore will define a more complex hyperplane.

Very low quality blogs and very high quality blogs are more easily identified and will have vectors that are further from the hyperplane than blogs having a quality in the middle of the quality spectrum. Therefore, the high quality and low quality distribution bins can be sized to receive a smaller range of normalized quality indicators than the middle bin.

Figure 2:
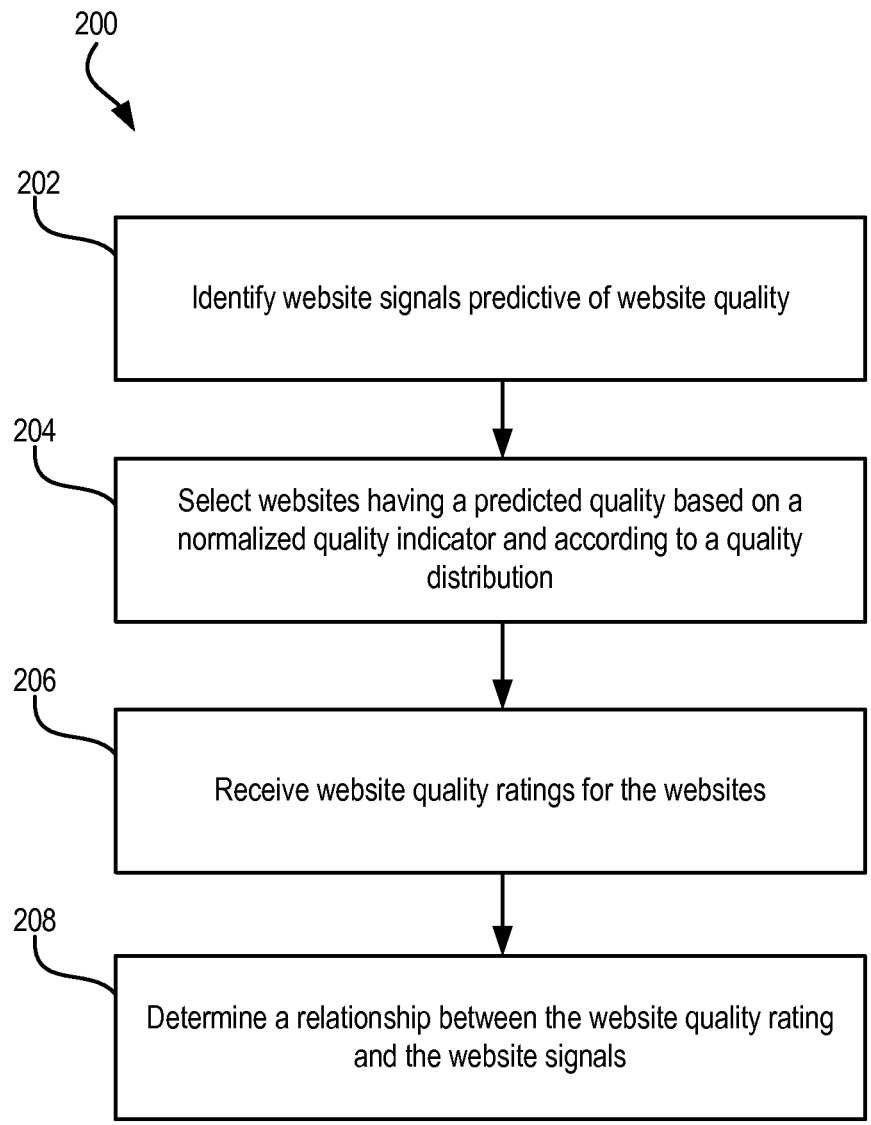
FIG. 2 is a flow chart illustrating a process for biasing the sample blog distribution

FIG. 2 is a flow chart illustrating a process 200 for biasing the sample blog distribution. The process can be performed, for example, by quality analysis server 104. The process 200 begins by identifying website signals predictive of website quality (202). The identification can be performed, for example, by selecting a website signal, such as the number of subscriptions to a blog, as a predictor of blog quality. Blog subscription rate is offered as an example of a website signal which can be used as a predictor of blog quality, but any website signal or combination of website signals that correlate to blog quality such as page rank scores, and click rates can be utilized.

In some implementations the value of the website signal selected is normalized by applying a factor to the website signal value. The normalization allows website signals having different value ranges to be represented in a single value range (e.g., 0-1). An example factor for normalizing the website signal values is represented by $$\frac{SignalValue}{MaxValue - MinValue}$$

where SignalValue is the value of the website signal to be normalized, MaxValue is the maximum value that any blog has for the corresponding website signal, and MinValue is the minimum value that any blog has for the corresponding website signal. Once the values are normalized the normalized values are summed resulting in a normalized quality indicator. The values can similarly be normalized according to standard deviations, weighted averages, or any other statistical method for comparing data having a different scale.

Next, the process 200 selects websites having a predicted quality based on a normalized quality indicator and according to a quality distribution (204). In some implementations, the normalized quality indicators are grouped into distribution bins defined in part by the selected quality distribution. The bins can vary in range size as previously described. The websites associated with the normalized quality indicators placed in the bins are selected for review by the raters.

Next, the process 200 receives website quality ratings for the websites (206). For example, the website quality ratings are based on the aggregate quality of the component web pages of a blog. The ratings are received, for example, from rating input devices 102 and can be received by the quality analysis server 104.

After receiving website quality ratings the process 200 determines a relationship between the website quality rating and the website signals (208). In some implementations, the relationships are identified by a machine learning algorithm, such as a support vector machine. The relationships are presented in the form of a model that is derived from the website quality ratings and the website signals. In other implementations, a relationship between the normalized quality indicator and the website quality rating can also be determined to allow for analysis regarding the accuracy of website selection and more accurate selection of biased distributions.

Figure 3:
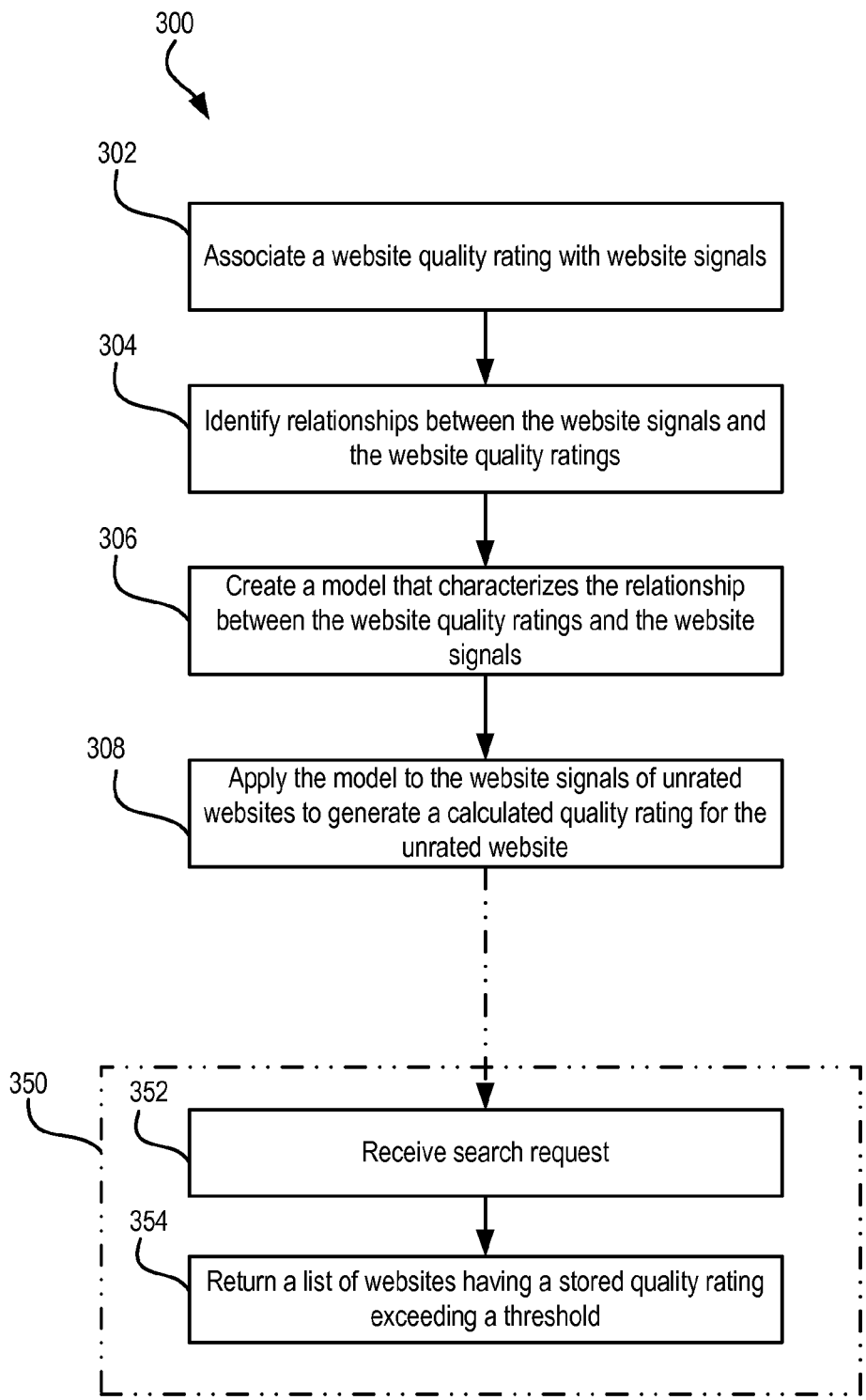
FIG. 3 is a flow chart illustrating a process 300 for generating website signals representing website quality.

FIG. 3 is a flow chart illustrating a process 300 for generating website signals representing website quality. The process 300 begins by associating a website quality rating with website signals (302). The website quality rating is based on an aggregate quality of the component web pages that are part of the website and the website signals represent attributes of the website. In some implementations, the website quality ratings are selected by raters after viewing the component pages of the website. The association is performed by storing the website quality rating in the signal store 110, for example, in a row of the database that stores the website signals of the rated website. The website signals can represent the blog subscription rate, click rate, PageRank™ score, or other attributes of the website.

The process 300 continues by identifying relationships between website signals and the website quality ratings (304). The relationships are identified, for example, by a machine learning subsystem implementing a support vector machine. The support vector machine receives the website signals, in the form of vectors, associated with high quality websites and plots the vectors in an n-dimensional space. The support vector machine also receives the website signals, in the form of vectors, associated with low quality websites and plots these vectors in the same n-dimensional space. The support vector machine learns the relationships between the website signal value and the website quality ratings by defining a hyperplane that separates the high quality websites from the low quality websites. The relationships are identified by the effect that varying the website signal values has on the website quality ratings.

Next, the process 300 creates a model that characterizes the relationships between the website quality ratings and the website signals (306). The model is created, for example, by generating a mathematical formula that characterizes the defined hyperplane. The model can be created, for example, by the relationship module 116.

The process 300 applies the model to the website signals of unrated websites to generate a calculated quality rating for the unrated website (308). For example, the website signals associated with the unrated websites are retrieved from the signal store 110 and used by the model to generate a calculated quality rating. The calculated quality rating will characterize the unrated website as either a high quality or low quality website. The model can be applied, for example, by the rating module 118.

Because websites change (e.g., RSS feeds are updated, web pages are edited), the quality of the websites likewise change over time. This is particularly true for blogs. For example, additional web pages with new content are added, content on existing web pages is edited (e.g., updated RSS feeds), and the website signals change over time. The new content may affect the overall quality of the website. Additionally, the changes to the website signals may affect the relationships between website quality rating and website signals. Therefore, the method 300 can be repeated periodically to update the relationships of the website quality ratings and the website signals.

In some implementations, repeating the method 300 can be triggered by a defined change in the websites signals. For example, if the PageRank™ score associated with a website varies by a defined percentage (e.g., 10%) then the process 300 can be triggered to update the model that characterizes the relationships between the website signals and the website quality rating.

In some implementations, an additional process 350 can be performed in conjunction with process 300. A system implementing the process 300 receives a search request (352). The search request is received from a user 114 and can be any type of web search, for example, a search for blogs on a particular topic. The search request can be received by a search engine 112.

The additional process 350 continues by delivering a list of websites having a stored quality rating exceeding a threshold (354). The list of websites is delivered in response to the search request. In some implementations, the list of websites is filtered and/or ordered according to the stored quality ratings associated with the websites. For example, the search results can comprise a list of websites each having a stored quality rating exceeding the threshold value. Additionally, the listing of websites can be displayed in an order corresponding to the stored quality ratings.

Implementations of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, module, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter described in this specification have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method, comprising:
   computing, for each of a plurality of websites, an initial quality score, the initial quality score for each website being computed based, at least in part, on an attribute of the website;
   selecting websites to be rated by raters, the websites being selected based on the initial quality scores of the websites and a specified quality distribution, the websites being selected to include:
   a first quantity of websites having initial quality scores that are between a low quality threshold score and a high quality threshold score, the low quality threshold score being a maximum initial quality score for a low quality website, the high quality threshold score being a minimum initial quality score for a high quality website, the high quality threshold score being higher than the low quality threshold score;

a second quantity of websites having initial quality scores that are below the low quality, threshold score, the second quantity being lower than the first quantity; and a third quantity of websites having initial quality scores that are above the high quality threshold score, the third quantity being lower than the first quantity;

selecting a group of the websites for each of the raters, each group of websites including:

at least one website having an initial quality score that is below the low quality threshold;

at least one website having an initial quality score that is above the high quality threshold; and at least one website having an initial quality score that is between the low quality threshold and the high quality threshold;

providing each of the raters with one group of websites;

receiving, from the raters, website quality ratings specifying rater selected measures of quality for the websites, the website quality rating for each website being based on an aggregate quality of a plurality of web pages in the website;

for each of the websites in the group, associating a website quality rating with website signals that represent attributes of the website;

creating a machine learned model based on the website quality ratings and the website signals, wherein the model characterizes relationships between the website quality ratings and the website signals; and applying the model to the website signals of unrated websites to generate calculated quality ratings for the unrated websites.

2. The method of claim 1, further comprising:
receiving a search request; and
returning a list of websites that includes websites having the calculated quality rating exceeding a threshold.

3. The method of claim 2, further comprising ordering the list of websites for display according to the calculated quality ratings of the websites in the list.

4. The method of claim 1, further comprising:
receiving, from the raters, category classifications of the websites; and
receiving, from the raters, indications of viewing appeal for the websites.

5. The method of claim 4, wherein the category classification is one or more of spam, obscene, did not load, or valid.

6. The method of claim 5, further comprising:
filtering the websites that have been classified as spam, obscene, or did not load from the group of websites, wherein the associating is performed for the websites remaining in the group following the filtering.

7. The method of claim 4, wherein receiving indications of viewing appeal comprises receiving, for each website, an indication that a rater has determined that the website has broad appeal or niche appeal.

8. The method of claim 1, wherein the websites are blogs.

9. The method of claim 1, wherein:
selecting a group of the websites for each of the raters comprises selecting a randomized sampling of the websites for each of the raters.

10. The method of claim 9, wherein creating the model comprises training a support vector machine with the website quality ratings and the website signals.

11. The method of claim 10, wherein training the support vector machine comprises identifying a hyperplane that maximizes a distance between support vectors and the hyperplane.

12. A system, comprising:
a client device; and
one or more computers operable to interact with the device and further operable to:
compute, for each of a plurality of websites, an initial quality score, the initial quality score for each website being computed based, at least in part, on an attribute of the website;
select websites to be rated by raters, the websites being selected based on the initial quality scores of the websites and a specified quality distribution, the websites being selected to include:
a first quantity of websites having initial quality scores that are between a low quality threshold score and a high quality threshold score, the low quality threshold score being a maximum initial quality score for a low quality website, the high quality threshold score being a minimum initial quality score for a high quality website, the high quality threshold score being higher than the low quality threshold score;
a second quantity of websites having initial quality scores that are below the low quality threshold score, the second quantity being lower than the first quantity; and
a third quantity of websites having initial quality scores that are above the high quality threshold score, the third quantity being lower than the first quantity;
select a group of the websites for each of the raters, each group of websites including:
at least one website having an initial quality score that is below the low quality threshold;
at least one website having an initial quality score that is above the high quality threshold; and
at least one website having an initial quality score that is between the low quality threshold and the high quality threshold;
provide each of the raters with one group of websites;
receive from the raters, website quality ratings specifying rater selected measures of quality for the websites, the website quality rating for each website being based on an aggregate quality of a plurality of web pages in the website;
for each of the websites in the group, associate a website quality rating with website signals that represent attributes of the website;
create a machine learned model based on the website quality ratings and the website signals, wherein the model characterizes relationships between the website quality ratings and the website signals; and
apply the model to the website signals of unrated websites to generate calculated quality ratings for the unrated websites.

13. The system of claim 12, further comprising a search engine to receive search requests and return a list of high quality websites based on the calculated quality ratings, the high quality websites having a calculated quality rating that exceeds a high quality threshold.

14. The method of claim 1, wherein selecting the group of the websites comprises:
normalizing the initial quality score for each of the websites to create normalized quality indicators for the websites;
creating bins for receiving the normalized quality indicators, each bin being created to receive normalized quality indicators having values that are within a specified range, and each bin being created to receive a specified quantity of normalized quality indicators; and assigning, to a first bin, a first specified quantity of normalized quality indicators for websites having a normalized quality indicator that is between a low quality normalized quality threshold and a high quality normalized threshold;

assigning, to a second bin, a second specified quantity of normalized quality indicators for websites having a normalized quality indicator that is below a low quality normalized quality threshold; and assigning, to a third bin, a third specified quantity of normalized quality indicators for websites having a normalized quality indicator that is above a high quality normalized quality threshold, wherein the specified quantity of normalized quality indicators for each bin is selected according to a distribution.

15. A non-transitory computer-readable medium having stored thereon, instructions that upon execution cause one or more computers to perform operations comprising:

computing, for each of a plurality of websites, an initial quality score, the initial quality score for each website being computed based, at least in part, on an attribute of the website;

selecting websites to be rated by raters, the websites being selected based on the initial quality scores of the websites and a specified quality distribution, the websites being selected to include:

a first quantity of websites having initial quality scores that are between a low quality threshold score and a high quality threshold score, the low quality threshold score being a maximum initial quality score for a low quality website, the high quality threshold score being a minimum initial quality score for a high quality website, the high quality threshold score being higher than the low quality threshold score;

a second quantity of websites having initial quality scores that are below the low quality threshold score, the second quantity being lower than the first quantity; and a third quantity of websites having initial quality scores that are above the high quality threshold score, the third quantity being lower than the first quantity;

selecting a group of the websites for each of the raters, each group of websites including:

at least one website having an initial quality score that is below the low quality threshold;

at least one website having an initial quality score that is above the high quality threshold; and at least one website having an initial quality score that is between the low quality threshold and the high quality threshold;

providing each of the raters with one of the groups of websites;

receiving, from the raters, website quality ratings specifying rater selected measures of quality for the websites, the website quality rating for each website being based on an aggregate quality of a plurality of web pages in the website;

for each of the websites in the group, associating a website quality rating with website signals that represent attributes of the website;

creating a machine learned model based on the website quality ratings and the website signals, wherein the model characterizes relationships between the website quality ratings and the website signals; and applying the model to the website signals of unrated websites to generate calculated quality ratings for the unrated websites.

16. The computer readable medium of claim 15, wherein the instructions further cause the one or more computers to perform operations comprising:

receiving a search request; and returning a list of websites that includes websites having the calculated quality rating exceeding a threshold.

17. The computer readable medium of claim 15, wherein the instructions further cause the one or more computers to perform operations comprising:

receiving, from the raters, category classifications of the websites; and receiving, from the raters, indications of viewing appeal for the websites.

18. The computer readable medium of claim 17, wherein the category classification is one or more of spam, obscene, did not load, or valid.

19. The computer readable medium of claim 18, wherein the instructions further cause the one or more computers to perform operations comprising:

filtering the websites that have been classified as spam, obscene, or did not load from the group of websites, wherein the associating is performed for the websites remaining in the group following the filtering.

20. The computer readable medium of claim 17, wherein receiving indications of viewing appeal comprises receiving, for each website, an indication that a rater has determined that the website has broad appeal or niche appeal.

21. The computer readable medium of claim 15, wherein the websites are blogs.

22. The computer readable medium of claim 15, wherein selecting a group of the websites for each of the raters comprises selecting a randomized sampling of the websites for each of the raters.

23. The system of claim 12, wherein the one or more computers are further operable to:

receive, from the raters, category classifications of the websites; and receive, from the raters, indications of viewing appeal for the websites.

24. The system of claim 23, wherein the category classification is one or more of spam, obscene, did not load, or valid.

25. The system of claim 24, wherein the one or more computers are further operable to:

filter the websites that have been classified as spam, obscene, or did not load from the group of websites, wherein the associating is performed for the websites remaining in the group following the filtering.

26. The system of claim 23, wherein the one or more computers are operable to receive indications of viewing appeal by being operable to receive, for each website, an indication that a rater has determined that the website has broad appeal or niche appeal.

27. The system of claim 12, wherein the websites are blogs.

28. The system of claim 12, wherein the one or more computers are further operable to select a randomized sampling of the websites for each of the raters.

* * * * *